US009891695B2

(12) United States Patent
Gendler et al.

(10) Patent No.: US 9,891,695 B2
(45) Date of Patent: Feb. 13, 2018

(54) FLUSHING AND RESTORING CORE MEMORY CONTENT TO EXTERNAL MEMORY

(71) Applicant: Intel Corporation, Santa Clara, CA (US)

(72) Inventors: Alexander Gendler, Kiriat Motzkin (IL); Ariel Berkovits, Yuvalim (IL); Michael Mishaeli, Zichron (IL); Nadav Shulman, Tel Mond (IL); Sameer Desai, Folsom, CA (US); Shani Rehana, Shoham (IL); Ittai Anati, Haifa (IL); Hisham Shafi, Akko (IL)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 14/751,889

(22) Filed: Jun. 26, 2015

(65) Prior Publication Data
US 2016/0378660 A1    Dec. 29, 2016

(51) Int. Cl.
*G06F 1/32*       (2006.01)
*G06F 12/08*      (2016.01)
(Continued)

(52) U.S. Cl.
CPC ........ *G06F 1/3287* (2013.01); *G06F 12/0868* (2013.01); *G06F 12/1433* (2013.01);
(Continued)

(58) Field of Classification Search
CPC . G06F 1/3287; G06F 12/0868; G06F 12/1433
See application file for complete search history.

(56) References Cited

U.S. PATENT DOCUMENTS

| 6,968,469 B1 * | 11/2005 | Fleischmann | G06F 1/3228 365/228 |
| 8,195,887 B2 * | 6/2012 | Hughes | G06F 1/3203 711/135 |

(Continued)

FOREIGN PATENT DOCUMENTS

WO    WO 2016/209476    12/2016

OTHER PUBLICATIONS

Notification of Transmittal of the International Search Report and the Written Opinion of the International Searching Authority issued for International Patent Application No. PCT/US2013/033961 dated Sep. 1, 2016.

(Continued)

*Primary Examiner* — Stefan Stoynov
(74) *Attorney, Agent, or Firm* — Patent Capital Group

(57) ABSTRACT

A method and apparatus for flushing and restoring core memory content to and from, respectively, external memory are described. In one embodiment, the apparatus is an integrated circuit comprising a plurality of processor cores, the plurality of process cores including one core having a first memory operable to store data of the one core, the one core to store data from the first memory to a second memory located externally to the processor in response to receipt of a first indication that the one core is to transition from a first low power idle state to a second low power idle state and receipt of a second indication generated externally from the one core indicating that the one core is to store the data from the first memory to the second memory, locations in the second memory at which the data is stored being accessible by the one core and inaccessible by other processor cores in the IC; and a power management controller coupled to the plurality of cores and located outside the plurality of cores.

23 Claims, 6 Drawing Sheets

(51) Int. Cl.
*G06F 12/14* (2006.01)
*G06F 12/0868* (2016.01)
*G06F 12/0804* (2016.01)
*G06F 12/0888* (2016.01)

(52) U.S. Cl.
CPC ...... *G06F 12/0804* (2013.01); *G06F 12/0888* (2013.01); *G06F 2212/1052* (2013.01); *G06F 2212/311* (2013.01); *G06F 2212/621* (2013.01)

(56) References Cited

U.S. PATENT DOCUMENTS

| | | |
|---|---|---|
| 2005/0044433 A1 | 2/2005 | Dunstan |
| 2010/0318725 A1 | 12/2010 | Kwon |
| 2011/0010531 A1 | 1/2011 | Henry et al. |
| 2012/0221801 A1 | 8/2012 | Okawa |
| 2013/0124898 A1 | 5/2013 | Fleming et al. |
| 2015/0121520 A1* | 4/2015 | Tsien ................ G06F 21/57 726/22 |

OTHER PUBLICATIONS

PCT International Search Report and Written Opinion in PCT International Patent Application Serial No. PCT/US2016/033961 dated Sep. 1, 2016.

* cited by examiner

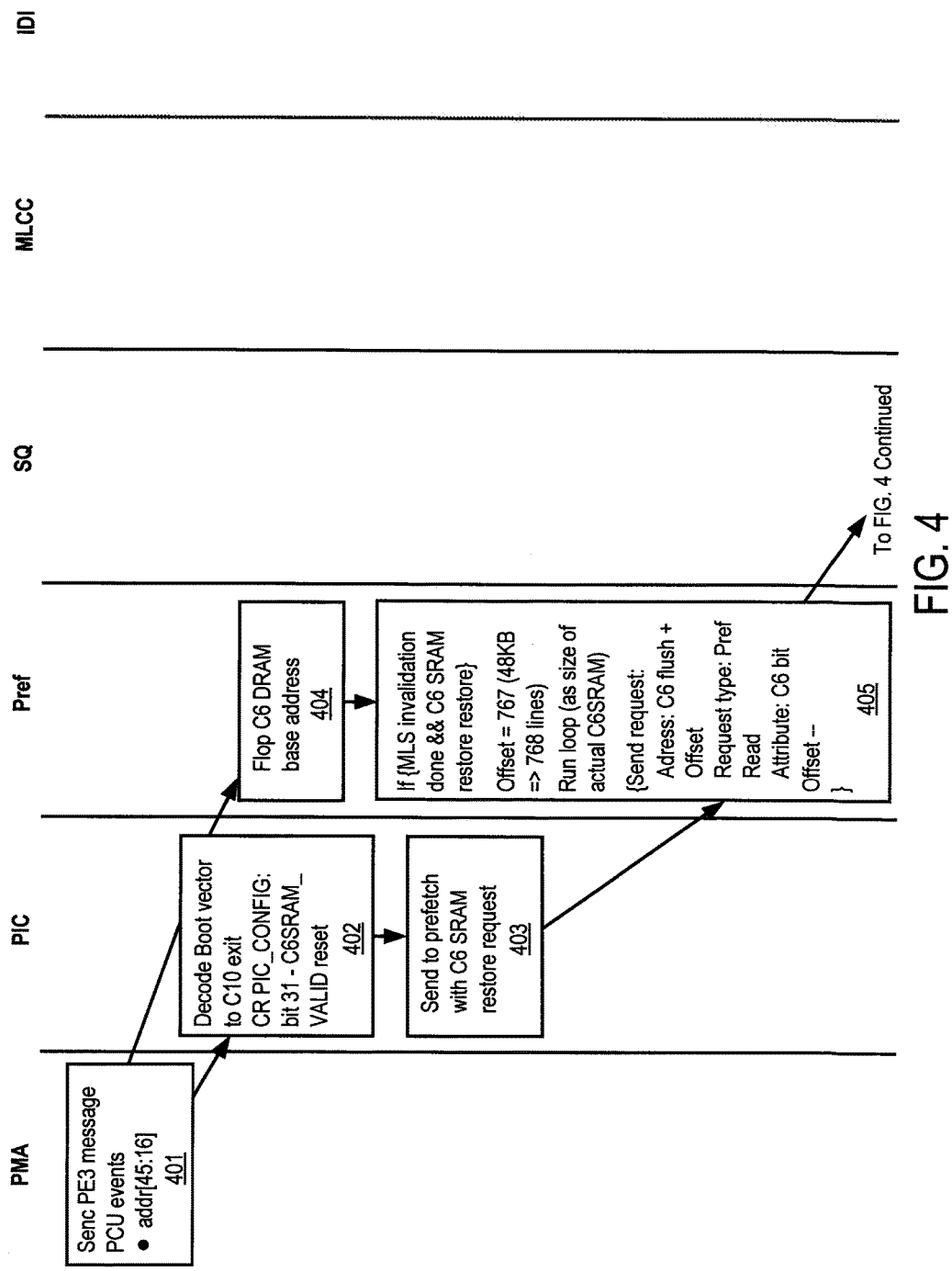

FLUSHING AND RESTORING CORE MEMORY CONTENT TO EXTERNAL MEMORY

FIELD OF THE INVENTION

The embodiments of the present invention relates to the field of power regulation for integrated circuits (ICs) (e.g., microprocessor, system-on-a-chip (SOC)); more particularly, embodiments of the present invention relate to coordinating saving state of a memory in core when reducing power of a core of the integrated circuit.

BACKGROUND OF THE INVENTION

Many modern processors have multiple power states, which can be utilized to balance the needed performance of the processor against the power the processor consumes. When a processor is not executing code, it is idle. C-states are low power idle states defined by Advanced Configuration and Power Interface (APCI). Often used power states include C0, C1, C3, C6-C10. In the C6 power state, for example, the execution cores in the state save their architectural state before removing the core voltage. In the past, this state was saved to a C6 static random access memory (SRAM) that was places in a coherent fabric coupled to, but outside of, the processor.

Recently, there has been a desire to relocate the C6 SRAM into the core, instead of outside the core. In such a case, removing voltage to the core would cause the architectural state being stored in the C6 SRAM to be lost, which is not desirable.

Furthermore, if the architectural state is saved outside the core, such as in results to performing a flush operation to another memory, there wasn't a security issue in the past if other cores were also powered down and couldn't gain access to and potentially corrupt the saved state. However, if other cores remain powered, without protections in place, these cores may be able to access the stored architectural state. Such access could lead to obtaining valuable data or having the data be corrupted, which prevents the core from returning to its previous state when it returns from the low power state.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
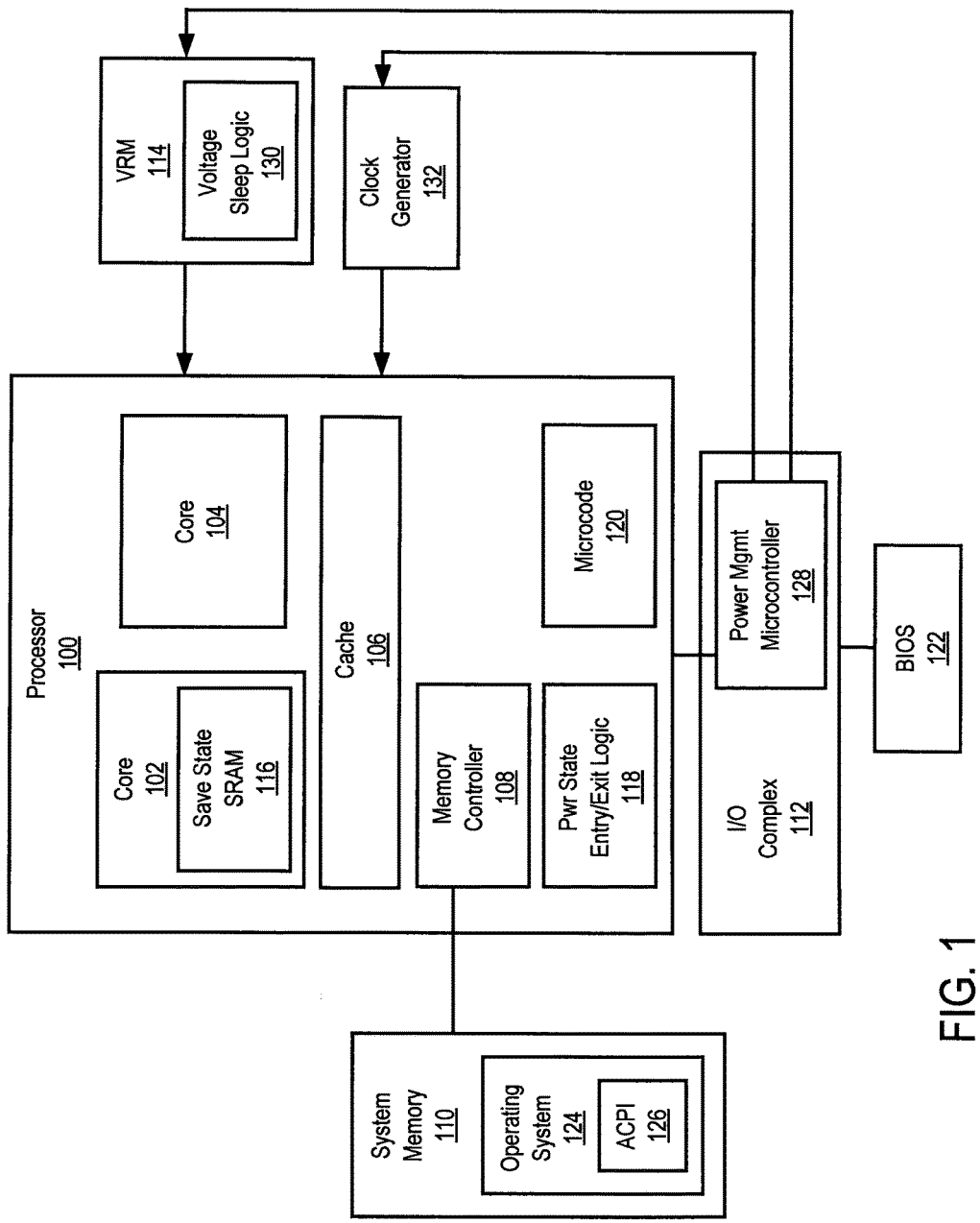
FIG. 1 is an embodiment of a device and a computer system.

FIG. 1 is an embodiment of a device and a computer system. In different embodiments, the computer system may be a desktop computer, a server computer, a laptop computer, a handheld electronic device, a television set top computer, an integrated computer within an appliance or vehicle, or any other type of conceivable computer system within the scope of the various embodiments described below.

In many embodiments, the computer system includes a processor 100. Processor 100 may comprise a microprocessor, system-on-a-chip (SoC), microcontroller, etc. Processor 100 may include a single core such as core 102, or have multiple cores, such as cores 102 and 104 (or more). A core often refers to logic capable of maintaining an independent architectural state, wherein each independently maintained architectural state is associated with at least some dedicated execution resources. In contrast to cores, a hardware thread typically refers to any logic located on the processor capable of maintaining an independent architectural state, wherein the independently maintained architectural states share access to execution resources. A cache memory 106 also resides on the processor die. In one embodiment, cache memory 106 includes multiple levels of cache, such as a level 1 cache and a level 2 cache. Furthermore, when there are multiple cores in the processor, each of the different levels of cache memory 106 may be shared or there may be a cache memory per core in different embodiments.

Additionally, in one embodiment, processor 100 also includes an integrated memory controller 108 in many embodiments. In another embodiment, memory controller 108 may be part of a coherent fabric. Memory controller 108 is coupled through a processor-memory interconnect to system memory 110. Memory controller 108 enables processor 100 and any other devices in the computer system to access system memory 110. In many embodiments, system memory 110 may comprise a form of random access memory (RAM) such as dynamic RAM (DRAM), flash memory, or another form of memory.

The processor also is coupled to a discrete input/output (I/O) complex 112 in many embodiments. In other embodiments that are not shown, the I/O complex may be integrated into the processor. The I/O complex 112 may include one or more integrated I/O host controllers (not shown) that allow I/O devices such as keyboards, mass storage devices, etc. to connect to the computer system.

The system also includes a voltage regulating meter (VRM) 114, which is coupled to the processor 100. The VRM 114 supplies a power operating voltage to the processor. In many embodiments, different components within the processor as well as different units within the processor core may be coupled to different power planes in the processor. When there is more than one power plane designed into the processor, VRM 114 may have the capability to change the delivered voltage to the two or more planes independently. This may allow portions of the processor to power down while other portions remain powered. In one embodiment, VRM 114 may include logic that is responsive to one or more signals to reduce voltage to processor 100, including down to a zero voltage state. VRM 114 logic may also ramp the voltage to the processor 100 back up again after exiting the zero voltage state. Furthermore, in other embodiments that are not shown, VRM 114 may be integrated into processor 100.

In some embodiments, one or more of cores 102 and 104 of processor 100 has a dedicated save state static RAM (SRAM) memory 116 that may be used to store the processor's state information when the processor is to enter into a low voltage state or a zero voltage state. In one embodiment, SRAM 116 is used to save the state of the processor core when entering the C6 power state.

Processor 100 also includes power state entry and exit logic 118 to control entry into and exit from a low or zero voltage state. Each power state includes a specific voltage that is used as the operating voltage fed to the processor from VRM 114. Each specific voltage may be programmed into VRM 114 using a voltage ID (VID) value. In many embodiments, a power state VID is paired with a specific processor operating frequency. Thus, in many embodiments, a power state table that stores voltage/frequency pairs is stored in the computer system. This table may be located within microcode in the processor 100, in storage within the I/O complex 112, in BIOS (basic input/output system) 122, or in other firmware in the system.

In many embodiments, when the computer system is operational, an operating system 124 is loaded into system memory 110. The operating system may include code to support an Advanced Configuration and Power Interface (ACPI) 126. Using this code, operating system 124 may have access to the power state table and command the ACPI interface to enter and exit different power states.

I/O Complex 112 also includes a power management microcontroller 128 in many embodiments. This may be referred to herein as PCU 128. Power management controller 128 includes state control logic that may control transitions between power management states and normal operational states that are associated with the processor 100. For example, many architecture processors have a normal operational state referred to as C0. On the other end of the power management spectrum, many architecture processors have a zero voltage processor "deep sleep" state referred to as C6 or even deeper sleep states, such as C10.

At a time when the processor is running in the C0 state, an ACPI command from the operating system or from elsewhere in the computer system may be sent to power management microcontroller 128 to bring the processor 100 down to the C6 state. Similarly, when running in the C6 state, an ACPI command from the operating system or from elsewhere in the computer system may be sent to power management microcontroller 128 to bring processor 100 down to the C10 or another deeper sleep state.

Specifically, the power management microcontroller 128 may send a signal to the power state entry and exit logic 118 in the processor 100 to initiate the steps to bring the processor to the C6 or C10 states. For example, prior to sending the processor into the C6 state, the processor requires several processor cycles to prepare to enter the state. The processor caches are flushed and then the processor architectural state is saved to prepare processor 100 for the C6 state. Once the processor has been prepared, power management microcontroller 128 may then send a signal to voltage sleep logic 130 within VRM 114 to begin the voltage ramp down from the C0 LFM state to the C6 state. During the C6 state, the banks of save state SRAM 116 remain powered.

In the C6 state, the processor core voltage is reduced to zero for the majority of processor 100, including the voltage to the core and the voltage to the caches. Additionally, the core clock is turned off and the phase locked loop (PLL) supplying the core is turned off. To accomplish this, power management microcontroller 128 can send a signal to stop a clock generator 132 supplying the processor with a system timer signal. The system timer signal provides timer ticks to the processor at a given rate.

Once in the C6 state, the processor core may transition into one of the deep sleep states, such as C7-C10.

Generally, a processor core will remain in the C6 or the C10 state until a wake event arrives and the power management microcontroller 128 will then begin the wakeup process. For example, the C6 to C0 wake up process starts by ramping the voltage supplied to the processor core up to the C0 state and then restoring the architectural state of the processor core the processor.

Saving and Restoring Processor Core State

As discussed above, SRAM 116 is part of a processor core and is used to save the architectural state when entering the C6 state. In one embodiment, the processor core 102 is responsible for powering itself down, and since SRAM 116 is part of the core itself, when transitioning to a different power state, such as C10, from the C6 power state, the contents of SRAM 116 is stored in a memory external to the processor core. In one embodiment, the contents are stored in a memory 110 (e.g., a dynamic RAM (DRAM)) external to processor 100. In one embodiment, the portion of memory 110 into which the contents are stored is referred to herein as C10 DRAM. While the memory banks of SRAM 116 are powered while in the C6 state, storing the data outside of processor core 102 is performed because processor core 102 including memory banks of SRAM 116 are powered down when transitioning to a deeper sleep state such as, for example, C10.

When storing data in SRAM 116, processor core 102 communicates with power management microcontroller 128 to determine if the data should be written to both SRAM 116 and also system memory 110 (e.g., C10 DRAM), which is located outside processor core 102. Writing to the C10 DRAM would occurs when flushing SRAM 116 to other locations. In prior computer system implementations, if there was a flush of data from the C6 SRAM to the C10 DRAM, all cores were asleep so there was no security risk that code executing in another core would access the C10 DRAM and potentially corrupt the data that had been stored from the C6 SRAM of another core. However, in on embodiment, processor core 102 can be put into the deeper sleep mode and have its state from the SRAM 116 (e.g., C6 SRAM) stored in memory 110 (e.g., C10 DRAM) while another processor core or cores are still powered and are capable of gaining access to the architectural state of SRAM 116 that is saved in memory 110 (e.g., C10 DRAM). The techniques described herein prevent one processor core from accessing locations in the memory 110 that contain the data stored as a result of another processor core storing their architectural state data in memory 110 from their C6 SRAM.

In one embodiment, the process for saving the C6 SRAM state includes two basic principles when saving the C6 SRAM as part of transitioning between the C6 state and a deeper sleep state (e.g., C10). First, the processor core communicates with power management microcontroller 128 to determine whether the contents of the C6 SRAM need to be flushed to the C10 DRAM. Power management microcontroller 128 receives instructions from operating system 124 indicating that the data should be stored in the C10 DRAM, thereby requiring a flush operation to occur, and sends that notification to the processor core.

When the processor core transitions out of the deeper sleep state, the processor core needs to know whether it is waking up out of the C6 state or a deeper sleep state (e.g., C10). If it is waking out of state C6, the processor core needs to restart and restore from the C6 SRAM. If it's waking out of the C10 state, the processor core first reads the data from the C10 DRAM to bring the data from the C10 DRAM into the C6 SRAM and then the processor performs the restart and restore operation from the C6 SRAM.

Second, for security purposes, any attempt to access to the C10 DRAM storing the architectural state of one core is blocked. That is, when the hardware finishes the save to the base address of the C10 DRAM, only the processor core associated with the architectural state data stored therein can access that location and if any other processor core attempts to access the that data in the C10 DRAM, the access is blocked.

In one embodiment, separate hardware (e.g., a finite state machine) is used to perform and flush and restore operations for the processor core. In one embodiment, the hardware allows the flushing of a line every clock cycle until all the lines of the cache are flushed to the external memory (C10 DRAM). In one embodiment, the hardware is in the SQ and the multi-level cache controller (MLCC) of the processor core.

The contents of the C6 SRAM are stored for the processor core at a specific DRAM base address. This is the location at which the contents of the C6 SRAM are stored when a core is transitioning from a C6 power state to a deeper power state. This is referred to herein as the C6 DRAM base address. In one embodiment, a different C6 DRAM base address is calculated for every processor core.

In one embodiment, the C6 DRAM base address for a particular processor core is stored in two locations, one inside the processor core itself and one outside the power domain of the processor core. The copy of the C6 DRAM base address is stored in a register in the processor core itself and the processor core accesses the register to obtain the address used for storing the data when it flushes the architectural state data in the C6 SRAM to the DRAM. The C6 DRAM base address is also stored outside of the processor core because copy stored in the processor core is no longer available after powering down the core and a copy is needed during restore to enable the processor core to obtain the data back from the DRAM. In one embodiment, the second location is stored using a special interface (e.g., a serial event bus) to save the address in another domain. When the processor core does power up again out of the deeper power state, the C6 DRAM base address is obtained by the processor core from the location external to the processor core and then used by the processor core uses to access the DRAM.

One embodiment of the processing flow for saving the C6 DRAM base address includes the following operations:
1) microcode (Ucode) in the processor core calculates the C6 DRAM base address; during the BIOS stage, the ucode reads the protected DRAM base address and then calculates the base address for the current core. For example, if the base address is A000 and each core gets 64 KB of storage, then, core0 will get A000 as a base address, core1 will get A000+64 KB as a base address, and core2 will get A000+126 KB as a base address, etc.
2) ucode in the processor core writes the C6 DRAM base address to a designated processor core register (ML3_CR_PIC_C6_DRAM_BASE);
3) When the multi-level cache (MLC) detects the write to the register, the MLC triggers a message (e.g., C2U SEB message) with header 1110 C6 DRAM base address; and
4) Next, a power management agent (PMA), which in one embodiment is dedicated to the processor core, but is outside of the processor core's power domain, stores the C6 DRAM base address at a particular location (e.g., GPSB CR CORE_PMA_CR_C6DRAM_ADDRESS).

One embodiment of the processing flow for restoring the C6 SRAM base address includes the following operations:
1) on every C6 exit, the programmable interrupt controller (PIC) gets a message (e.g., U2C message) indicating the C6 DRAM address will be stored in the designated processor core register (e.g., ML3_CR_PIC_C6_DRAM_BASE).

C6 SRAM Flush Flow

In one embodiment, when the processor core is to enter the C6 state, the power remains applied to the processor core until the last thread goes to sleep (e.g., has no operations left to perform). After that point in time, each thread indicates it has nothing left to perform and the processor core is ready to be powered down.

When the processor core is ready to be powered down, the ucode of the processor core communicates with PCU 128 to obtain an indication (e.g., a new bit) that indicates whether the processor core is to only store the architectural state data of the processor core to the C6 SRAM or also flush the data from the C6 SRAM to the C10 DRAM. PCU 128 also provides the proposed new C state to the processor core. Thus, when all threads in the processor core go to sleep, the processor core obtains an indication of the C-state to which it is transitioning (e.g., the C10) and an indication as to whether the C6 SRAM flush needs to occur.

After all these above conditions are met, if the processor core receives an indication (e.g., the new bit is set) to indicate a flush is necessary, a flush of the C6 SRAM occurs. In one embodiment, the flush only occurs after the interrupt window closes which indicates that the processor core is at a point of no return and is not going to go back to the normal mode (e.g., C0). At this point, a write operation occurs to trigger the flush. The trigger causes hardware in the SQ and the MLCC to perform the flush operation. When the hardware is finished performing the flush operation, the processor core ucode writes to PCU 128 to notify it that the flush has been completed. At this point, PCU 128 cuts the power to the processor core and only the C6 SRAM has power.

With respect to the MLC hardware, the C6 SRAM contains 48 KB and when the hardware receives a flush trigger, there is a loop that reads each of the cache lines and sends them through an interface to the DRAM. In one embodiment, the interface is a point-to-point interface (e.g., in-die interconnect (IDI)). The data is also marked as uncacheable so that as the data proceeds to the C10 DRAM, it is not cached in an intervening cache memory. The data is provided to the MLC controller and stored in a special protected array based on the DRAM base address that it is assigned to the processor core. After all the lines have been stored, the MLC controller sends an indication (e.g., a bit) to the ucode of the processor core that indicates that the flush is done. After the indication, the ucode of the processor core writes to the PUC that the C6 SRAM has been flushed.

Figure 2:
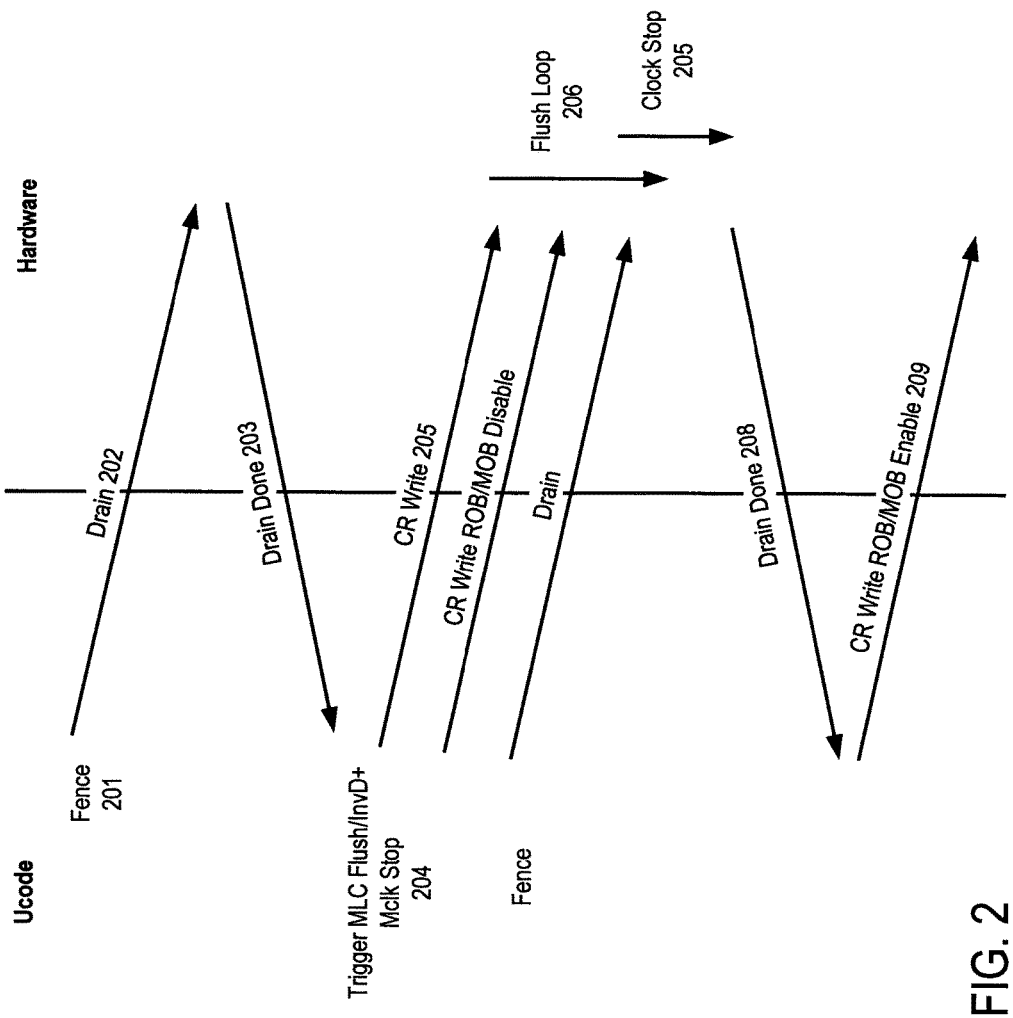
FIG. 2 illustrates one embodiment of the C6 SRAM flush flow.

FIG. 2 illustrates one embodiment of the C6 SRAM flush flow. Referring to FIG. 2, the ucode performs a fence operation (201) that causes hardware to perform a drain (202) in which all hardware of the processor completes its activity (e.g., operations) to become idle. When there is no more activity, the hardware indicates to the ucode that there is no more activity occurring by sending a drain done signal 203. In response to drain done signal (203), the ucode triggers the MLC to perform a flush and invalidate operation to occur, as well as a stop clock process for the processor core (204) using a series of write operations and by disabling the read order buffering (ROB) and memory order buffer (MOB) (205) (which are powered down since only the SQ and MLCC are clocked during flush). This causes the hardware in the SQ and MLCC to perform a flush loop (206). The hardware also stops the processor core clock (207) (e.g., gates the clock from the processor core, turns off the clock of the processor core, etc.). When the flush loop (204) and the clock stopping (207) has been completed, the hardware sends the drain done indication (208) to the ucode of the processor core to indicate that the flush operation and clock stopping has been completed. After the drain done indication (208) has been received indicating the flush is done, the clock of the processor core is re-enabled, as well as the ROB and MOB to allow the ucode in the processor core to finish the C6 entry code. Thereafter once C6 entry code has been completed, the ucode in the processor core notifies the hardware that it can be powered down (209).

Figure 3:
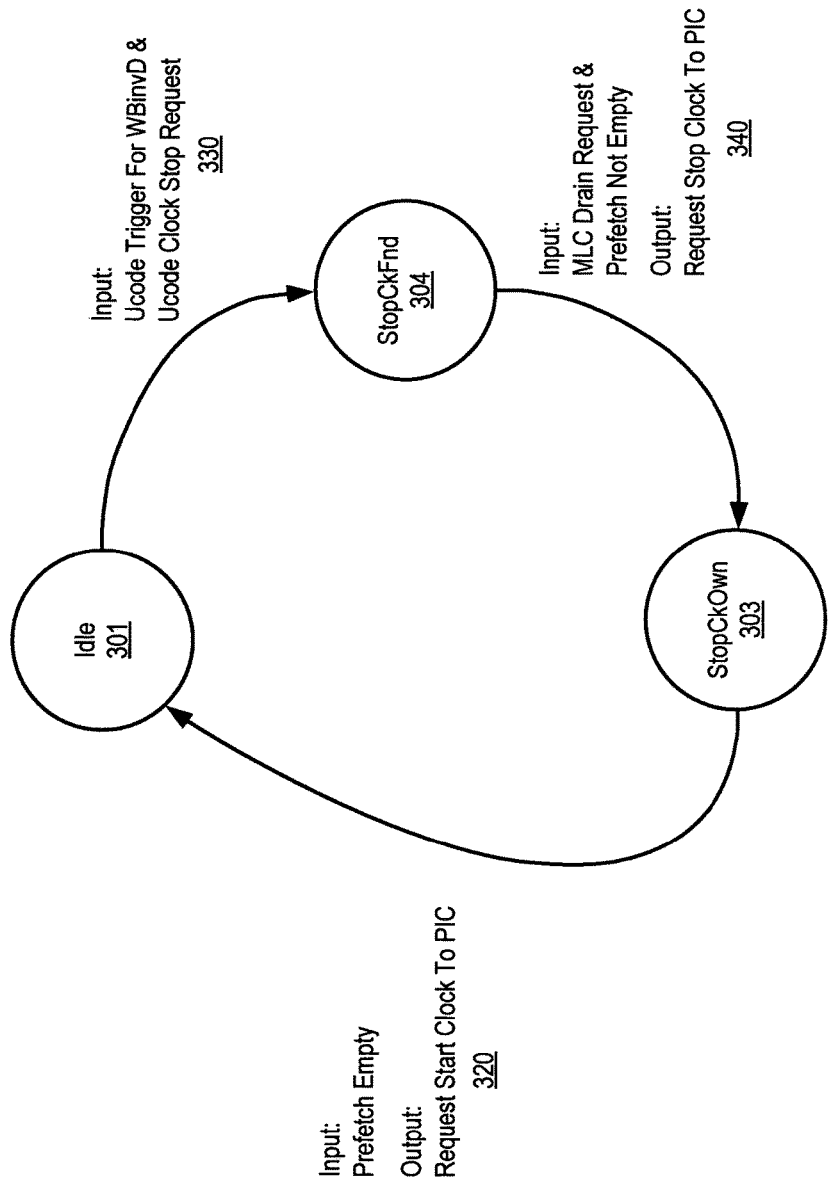
FIG. 3 illustrates a flush loop finite state machine (FSM) to stop the clock of the processor core.

FIG. 3 illustrates a flush loop finite state machine (FSM) to stop the clock of the processor core. Referring to FIG. 3, from the idle state 301 (e.g., C6 idle state), the ucode of the processor core triggers the flush operation (WBinvD) and sends a stop clock request (330). After these two inputs, the FSM enters a stop clock request state 302. Once in this state, the MLC receives a drain request, as well as an indication that there are all of the flush (or restore) operations from the prefetcher (i.e., prefetch not empty) have already been sent. At that point, the flush (or restore) process is, done and a request to stop the clock of the processor core is sent to the PIC (340). After this occurs, the FSM transitions to the stop clock state 303 in which the clock of the processor core is stopped. The FSM remains in this state until an indication that the prefetcher of the processor core is empty and a request to start the clock is sent to the PIC (320). In response to this, the FSM transitions back to idle state 301.

Figure 5:
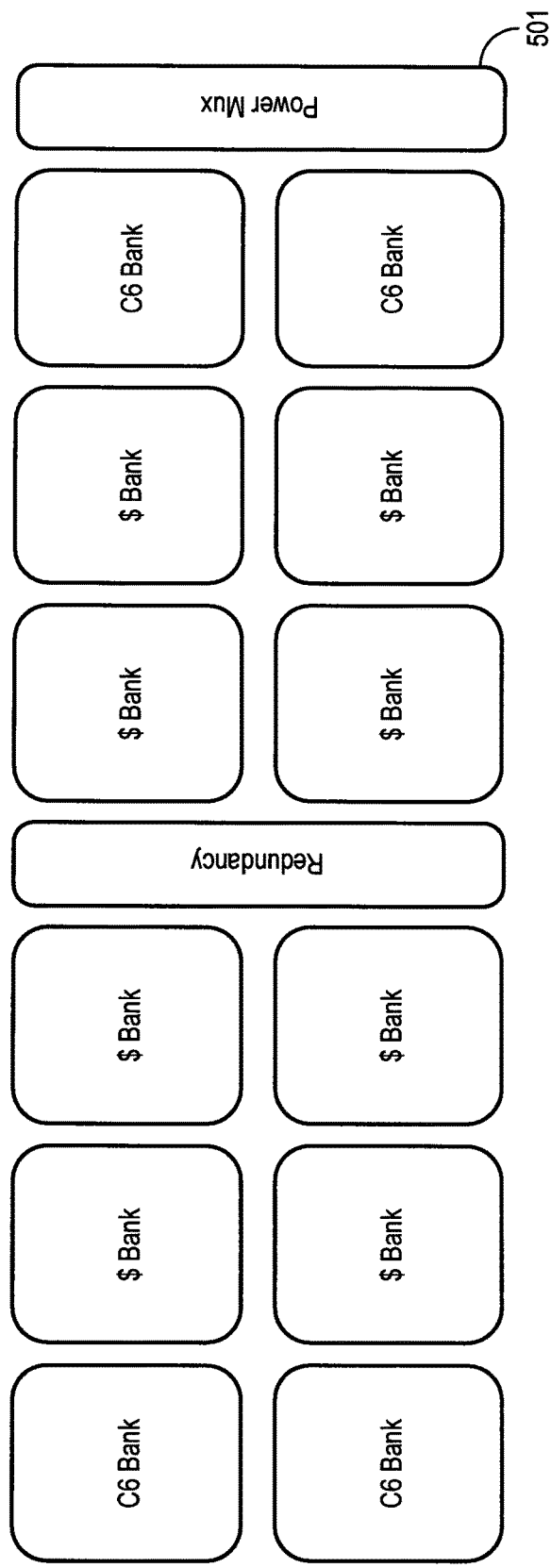
FIG. 5 is a block diagram of the C6 SRAM.

FIG. 5 is a block diagram of the C6 SRAM. Referring to FIG. 5, the SRAM has an array of memory banks, including C6 banks of memory as well as some redundancy logic and a power multiplexer (mux) 501. Mux 501 is used to apply power to the array of memory banks and remove power from the memory banks when transitioning to a deep sleep state (e.g., C10).

C6 SRAM Restore

When the core wakes, the base address of the C6 SRAM has been stored outside the processor core is obtained so that the processor core can restore the C6 SRAM from the C10 DRAM.

Figure 4:
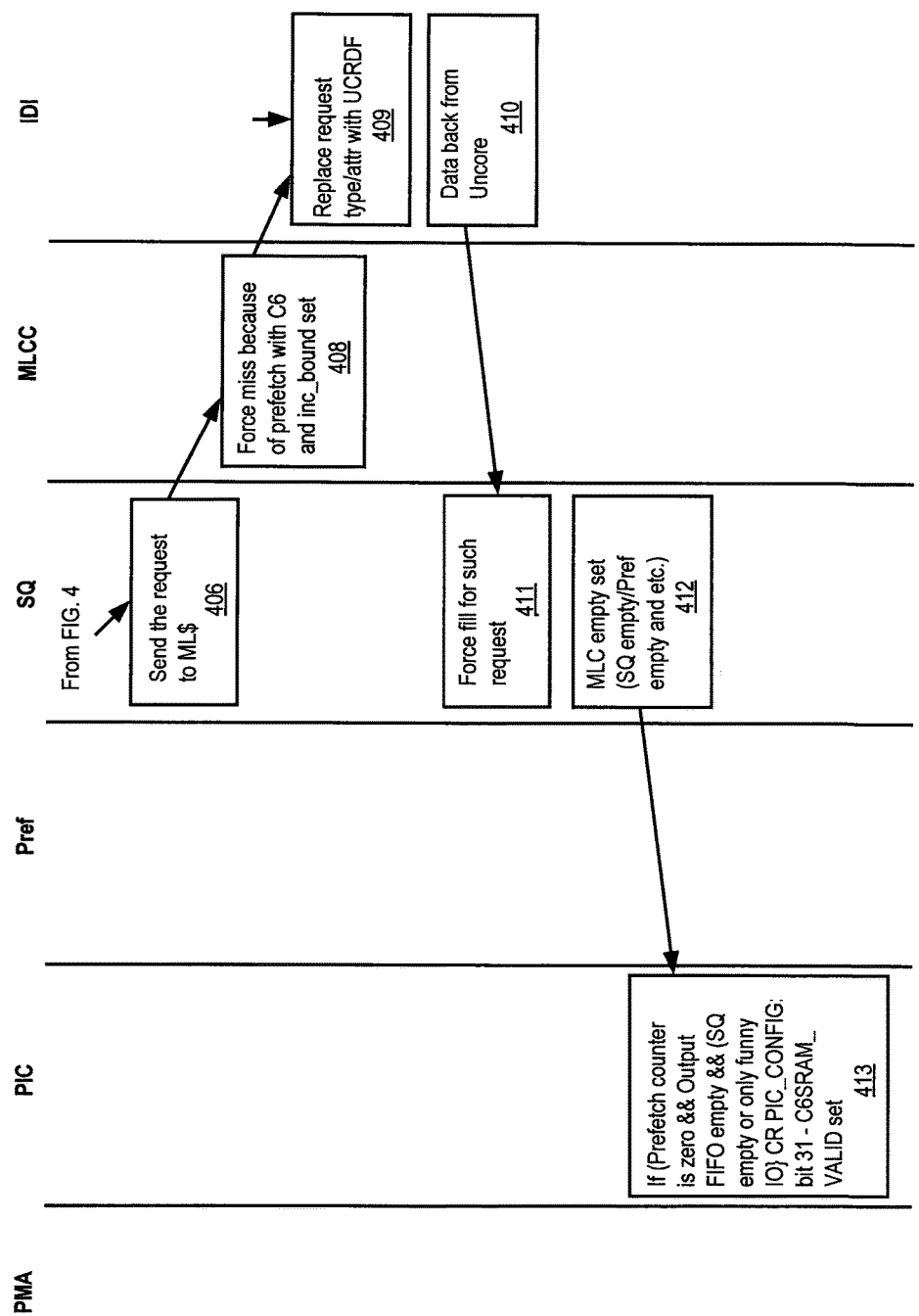
FIG. 4 illustrates one embodiment of the flow of the SRAM restore process.

FIG. 4 illustrates one embodiment of the flow of the SRAM restore process. Referring to FIG. 4, the power management agent (PMA) that is located outside the core is a power management controller for the core. Upon booting, the PMA sends a message to the PIC (via the PCU) to determine whether the restore operation is to occur from the C6 SRAM or from the C6 DRAM (401). In response to the message, the PIC decodes a boot vector to examine a C6 SRAM valid bit to determine whether the restore operation is to occur from the C6 SRAM or from the C6 DRAM (402). If it is valid, the PIC sends a wire to the prefetcher of the processor core to cause a restore from the C6 SRAM (403). If the bit is not valid, the restore operation occurs from DRAM and the PIC signals the prefetcher with the DRAM base address (404). In response to the address, the prefetcher performs a hardware loop of read requests to obtain the data back from the DRAM (405). The SQ sends the read requests to the multilevel cache (MLC) (406), which causes the MLC controller (MLCC) to force a miss (408), which causes the requests to go to memory via the memory controller of the processor, the IDI and the uncore. At the IDI, the requests are marked uncacheable and are forwarded to DRAM via the IDI and the uncore (409). Note that the data is also marked as uncacheable so that none of the data is cached at any other cache memory between the DRAM and the C6 SRAM, which prevents the data from being obtained by other entities (e.g., other processor cores).

Subsequently, the data is returned from the uncore (410) and the SQ force fills a write operation to the C6 SRAM with the data for all the cache lines until all the data has been restored into the C6 SRAM (411). After all the lines have been written the cache memory, the SQ sends an empty set indication to the PIC (412) which sets the bit indicating that the C6 SRAM now contains valid data. When this bit is set, the ucode of the processor core can perform a restore operation from the C6 SRAM.

One embodiment of the processing flow for restoring the C6 SRAM base address includes the following operations:

1) The processor core receives a message (e.g., boot vector U2C SEB message) and decodes it to determine the reset type that it has been instructed to perform.

2) If reset type is C10 exit, the processor core reset an indication (e.g., a C6 SRAM valid bit) that the contents of the C6 SRAM are not valid (e.g., a PIC_CONFIG bit C6SRAM_VALID)

3) The ucode of the processor core starts performing polling for the indication to determine when the contents of the C6 SRAM are valid. If the contents of the C6 SRAM are not valid and ucode cannot perform the exit from the C6 state as it is forbidden to read the C6 SRAM array while its contents are not valid.

3a) The MLC hardware, based on reset type, runs a loop of all the cache lines to restore the contents of the C6 SRAM. In one embodiment, this is performed by sending a request to the SQ [what is the SQ?] as a MLC prefetch with C6 bit, which causes the C6 SRAM to force a miss; the IDI interface then sends an opcode (UCRDF) indicating that the returned data is uncacheable (so that no intervening caching of the data occurs). The SQ performs a force fill of the data associated with all the lines and, once completed, sets the C6 SRAM valid bit to indicate its contents are valid.

4) When the C6 SRAM valid bit is set, the ucode of the processor core can continue to restore from the C6 state (e.g., return to the C0 state when the processor core returns to normal operation).

To reiterate, in one embodiment, the process described above has increased security because the ucode of a processor core cannot write to the C6 DRAM area. In one embodiment, the entire address range of the C6 DRAM is stored in a machine register and its access is forbidden.

In a first example embodiment, an integrated circuit (IC) comprises a plurality of processor cores, the plurality of process cores including one core having a first memory operable to store data of the one core, the one core to store data from the first memory to a second memory located externally to the processor in response to receipt of a first indication that the one core is to transition from a first low power idle state to a second low power idle state and receipt of a second indication generated externally from the one core indicating that the one core is to store the data from the first memory to the second memory, locations in the second memory at which the data is stored being accessible by the one core and inaccessible by other processor cores in the IC; and a power management controller coupled to the plurality of cores and located outside the plurality of cores.

In another example embodiment, the subject matter of the first example embodiment can optionally include that the first memory is a static random access memory (SRAM) and the second memory is a dynamic RAM (DRAM).

In another example embodiment, the subject matter of the first example embodiment can optionally include that the second indication is from the power management controller.

In another example embodiment, the subject matter of the first example embodiment can optionally include that the second indication is from an operating system.

In another example embodiment, the subject matter of the first example embodiment can optionally include that the data is designated as uncacheable as part of storing the data to the second memory to prevent any intermediate storage between the first and second memories from caching the data.

In another example embodiment, the subject matter of the first example embodiment can optionally include a third memory in the one core to store a base address associated with the locations in the second memory is stored in the one core, and a fourth memory in the IC but outside the power domain of the one core, wherein the location is accessed to provide the base address to the one core for use in restoring the data to the first memory when transitioning back to the first low power idle state from the second low power idle state.

In another example embodiment, the subject matter of the first example embodiment can optionally include a power management agent associated with and located outside the power domain of the one core and not associated with any other core in the processor to provide the base address to the one core.

In a second example embodiment, a system comprises a dynamic random access memory (DRAM), and a processor coupled to the DRAM and having one or more cores, where at least one of the one or more cores having an SRAM operable to store architectural state data of the one core, the one core controlling its transition from a first low power idle state to a second low power idle state including writing the architectural state data from the SRAM to the DRAM in response to receipt of a first indication that the one core is to transition from a first sleep state to a deeper sleep state from a current sleep state and receipt of a second indication generated externally from the one core indicating that the one core is to store the architectural state data from the SRAM to the DRAM, locations in the DRAM at which the architectural state data is stored being accessible by the one core and inaccessible by other processor cores in the processor.

In another example embodiment, the subject matter of the second example embodiment can optionally include that the second indication is from a power management unit in the processor but outside the one core.

In another example embodiment, the subject matter of the second example embodiment can optionally include that second indication is from an operating system.

In another example embodiment, the subject matter of the second example embodiment can optionally include that the architectural state data is designated as uncacheable as part of storing the architectural state data to the DRAM to prevent any intermediate storage between the SRAM and DRAM from caching the architectural state data.

In another example embodiment, the subject matter of the second example embodiment can optionally include that a base address associated with the locations in the DRAM is stored in the one core and in a location in the processor that is outside the power domain of the one core, wherein the location is accessed to provide the base address to the one core for use in restoring the architectural state data to the SRAM when transitioning back to the first low power idle state from the second low power idle state.

In another example embodiment, the subject matter of the second example embodiment can optionally include a power management agent associated with and located outside the power domain of the one core and not associated with any other core in the processor to provide the base address to the one core.

In a third example embodiment, a method comprises receiving, by a processor core in an integrated circuit (IC), a first indication that the processor core is to transition from a first sleep state to a deeper sleep state; receiving a second indication generated externally from the processor core indicating whether the processor core is to store data from a first memory in the processor core to a second memory located externally to the IC; and in response to the second indication, performing write operations to write data from the first memory to the second memory, wherein locations in the second memory at which the data is stored are accessible by the processor core and inaccessible by other processor cores in the IC.

In another example embodiment, the subject matter of the third example embodiment can optionally include that the first memory is a static random access memory (SRAM) and the second memory is a dynamic RAM (DRAM).

In another example embodiment, the subject matter of the third example embodiment can optionally include that the second indication is from a power control unit in the IC.

In another example embodiment, the subject matter of the third example embodiment can optionally include that the second indication is from an operating system.

In another example embodiment, the subject matter of the third example embodiment can optionally include designating the data from the first memory as uncacheable to prevent intermediate storage between the first and second memory from caching the data.

In another example embodiment, the subject matter of the third example embodiment can optionally include storing a base address associated with the locations in the second memory in the processor core and in another location in the IC that is outside the power domain of the processor core.

In another example embodiment, the subject matter of the third example embodiment can optionally include restoring the data into the first memory from the second memory, by checking a third indication as to whether perform a restore operation from the first memory or the second memory; determining that the data is to be restored from the second memory based on the third indication; iteratively sending a request as a prefetch to obtain a portion of the data and forcing a miss of the first memory to cause the data request to be sent to the second memory to obtain the data from the second memory; and setting a fourth indication to indicate to the processor core that the first memory contains valid data.

In a fourth example embodiment, an article of manufacture has one or more non-transitory computer readable storage media storing instructions which when executed by a system to perform a method for controlling storage of data of a processor core, and the method comprises receiving, by a processor core in an integrated circuit (IC), a first indication that the processor core is to transition from a first sleep state to a deeper sleep state; receiving a second indication generated externally from the processor core indicating whether the processor core is to store data from an SRAM in the processor core to a DRAM located externally to the IC; and in response to the second indication, performing write operations to write data from the SRAM to the DRAM, wherein locations in the DRAM at which the data is stored are accessible by the processor core and inaccessible by other processor cores in the IC.

In another example embodiment, the subject matter of the fourth example embodiment can optionally include that the method further comprises designating the data from the first memory as uncacheable to prevent intermediate storage between the first and second memory from caching the data.

In another example embodiment, the subject matter of the third example embodiment can optionally include that the method further comprises storing a base address associated with the locations in the second memory in the processor core and in another location in the IC that is outside the power domain of the processor core.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An integrated circuit (IC) comprising:
a plurality of processor cores, the plurality of processor cores including one core having a first memory operable to store data of the one core,
the one core to store data from the first memory to a second memory located externally to the processor in response to receipt of a first indication that the one core is to transition from a first low power idle state to a second low power idle state and receipt of a second indication generated externally from the one core indicating that the one core is to store the data from the first memory to the second memory,
locations in the second memory at which the data is stored being accessible by the one core and inaccessible by other processor cores in the IC; and
a power management controller coupled to the plurality of cores and located outside the plurality of cores.

2. The processor defined in claim 1 wherein the first memory is a static random access memory (SRAM) and the second memory is a dynamic RAM (DRAM).

3. The processor defined in claim 1 wherein the second indication is from the power management controller.

4. The processor defined in claim 1 wherein the second indication is from an operating system.

5. The processor defined in claim 1 wherein the data is designated as uncacheable as part of storing the data to the second memory to prevent any intermediate storage between the first and second memories from caching the data.

6. The processor defined in claim 1 further comprising:
a third memory in the one core to store a base address associated with the locations in the second memory; and
a fourth memory in the IC but outside the power domain of the one core, wherein the location is accessed to provide the base address to the one core for use in restoring the data to the first memory when transitioning back to the first low power idle state from the second low power idle state.

7. The processor defined in claim 6 further comprising a power management microcontroller device associated with and located outside the power domain of the one core and not associated with any other core in the processor to provide the base address to the one core.

8. A system comprising:
a dynamic random access memory (DRAM); and
a processor coupled to the DRAM and having one or more cores, at least one of the one or more cores having a status random access memory (SRAM) operable to store architectural state data of the one core,
the one core controlling its transition from a first low power idle state to a second low power idle state including writing the architectural state data from the SRAM to the DRAM in response to receipt of a first indication that the one core is to transition from a first sleep state to a deeper sleep state from a current sleep state and receipt of a second indication generated externally from the one core indicating that the one core is to store the architectural state data from the SRAM to the DRAM,
locations in the DRAM at which the architectural state data is stored being accessible by the one core and inaccessible by other processor cores in the processor.

9. The system defined in claim 8 wherein the second indication is from a power management unit in the processor but outside the one core.

10. The system defined in claim 8 wherein the second indication is from an operating system.

11. The system defined in claim 8 wherein the architectural state data is designated as uncacheable as part of storing the architectural state data to the DRAM to prevent any intermediate storage between the SRAM and DRAM from caching the architectural state data.

12. The system defined in claim 8 wherein a base address associated with the locations in the DRAM is stored in the one core and in a location in the processor that is outside the power domain of the one core, wherein the location is accessed to provide the base address to the one core for use in restoring the architectural state data to the SRAM when transitioning back to the first low power idle state from the second low power idle state.

13. The system defined in claim 12 further comprising a power management microcontroller device associated with and located outside the power domain of the one core and not associated with any other core in the processor to provide the base address to the one core.

14. A method comprising:
receiving, by a processor core in an integrated circuit (IC), a first indication that the processor core is to transition from a first sleep state to a deeper sleep state;
receiving a second indication generated externally from the processor core indicating whether the processor core is to store data from a first memory in the processor core to a second memory located externally to the IC; and
in response to the second indication, performing write operations to write data from the first memory to the second memory, wherein locations in the second memory at which the data is stored are accessible by the processor core and inaccessible by other processor cores in the IC.

15. The method defined in claim 14 wherein the first memory is a static random access memory (SRAM) and the second memory is a dynamic RAM (DRAM).

16. The method defined in claim 14 wherein the second indication is from a power control unit in the IC.

17. The method defined in claim 14 wherein the second indication is from an operating system.

18. The method defined in claim 14 further comprising designating the data from the first memory as uncacheable to prevent intermediate storage between the first and second memory from caching the data.

19. The method defined in claim 14 further comprising storing a base address associated with the locations in the second memory in the processor core and in another location in the IC that is outside the power domain of the processor core.

20. The method defined in claim 14 further comprising restoring the data into the first memory from the second memory, including:
checking a third indication as to whether perform a restore operation from the first memory or the second memory;
determining that the data is to be restored from the second memory based on the third indication;
iteratively sending a request as a prefetch to obtain a portion of the data and forcing a miss of the first memory to cause the data request to be sent to the second memory to obtain the data from the second memory; and
setting a fourth indication to indicate to the processor core that the first memory contains valid data.

21. An article of manufacture having one or more non-transitory computer readable storage media storing instructions which when executed by a system to perform a method for controlling storage of data of a processor core, the method comprising:
receiving, by a processor core in an integrated circuit (IC), a first indication that the processor core is to transition from a first sleep state to a deeper sleep state;
receiving a second indication generated externally from the processor core indicating whether the processor core is to store data from a status random access memory (SRAM) in the processor core to a DRAM located externally to the IC; and
in response to the second indication, performing write operations to write data from the SRAM to the DRAM, wherein locations in the DRAM at which the data is stored are accessible by the processor core and inaccessible by other processor cores in the IC.

22. The article of manufacture defined in claim 21 further comprising designating the data from the first memory as uncacheable to prevent intermediate storage between the first and second memory from caching the data.

23. The article of manufacture defined in claim 21 further comprising storing a base address associated with the locations in the second memory in the processor core and in another location in the IC that is outside the power domain of the processor core.

* * * * *

UNITED STATES PATENT AND TRADEMARK OFFICE
CERTIFICATE OF CORRECTION

PATENT NO. : 9,891,695 B2
APPLICATION NO. : 14/751889
DATED : February 13, 2018
INVENTOR(S) : Alexander Gendler et al.

It is certified that error appears in the above-identified patent and that said Letters Patent is hereby corrected as shown below:

On the Title Page

Item (72), Column 1, under "Inventors", please add the following:
Jawad Haj-Yihia
Kloten, Switzerland
Vijay S R Degalahal
Bangalore, India
Lital Levy-Rubin
Tel Aviv, Israel
Tal Kuzi
Tel Aviv, Israel Signed and Sealed this
Twenty-seventh Day of September, 2022

Katherine Kelly Vidal
*Director of the United States Patent and Trademark Office*